United States Patent
Maniktala

(10) Patent No.: US 6,515,457 B1
(45) Date of Patent: Feb. 4, 2003

(54) DISCONTINUOUS-MODE BUCK-BOOST SLAVE CONVERTER WORKING OFF A CONTINUOUS-MODE MASTER BUCK CONVERTER

(75) Inventor: Sanjaya Maniktala, Fremont, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 10/153,291

(22) Filed: May 21, 2002

(51) Int. Cl.[7] .............................................. G05F 1/656
(52) U.S. Cl. ....................................... 323/222; 323/284
(58) Field of Search ................................. 323/222, 285, 323/288, 282, 284, 286

(56) References Cited

U.S. PATENT DOCUMENTS 5,436,818 A * 7/1995 Barthold ..................... 363/101
5,969,484 A * 10/1999 Santi et al. .................. 315/224
6,034,513 A * 3/2000 Farrington et al. ......... 323/222
6,304,065 B1 * 10/2001 Wittenbreder ............... 323/225

* cited by examiner

Primary Examiner—Bao Q. Vu
(74) Attorney, Agent, or Firm—Merchant & Gould P.C.; Mark R. Hennings

(57) ABSTRACT

An efficient, well-regulated slave buck-boost converter is driven from a master buck converter. The derived transfer function of a discontinuous mode slave buck-boost converter that is being driven from a continuous mode master buck converter is not dependent upon the input voltage. Thus, line regulation is automatically achieved. Load regulation is achieved by using a shunt regulator at the output of the slave buck-boost converter. The shunt regulator is arranged such that operating the slave buck-boost converter at its designed maximum load is almost as efficient as a conventional buck-boost converter. The slave converter is operated in discontinuous mode so that changing the inductance of the slave converter provides a desired voltage output.

20 Claims, 1 Drawing Sheet

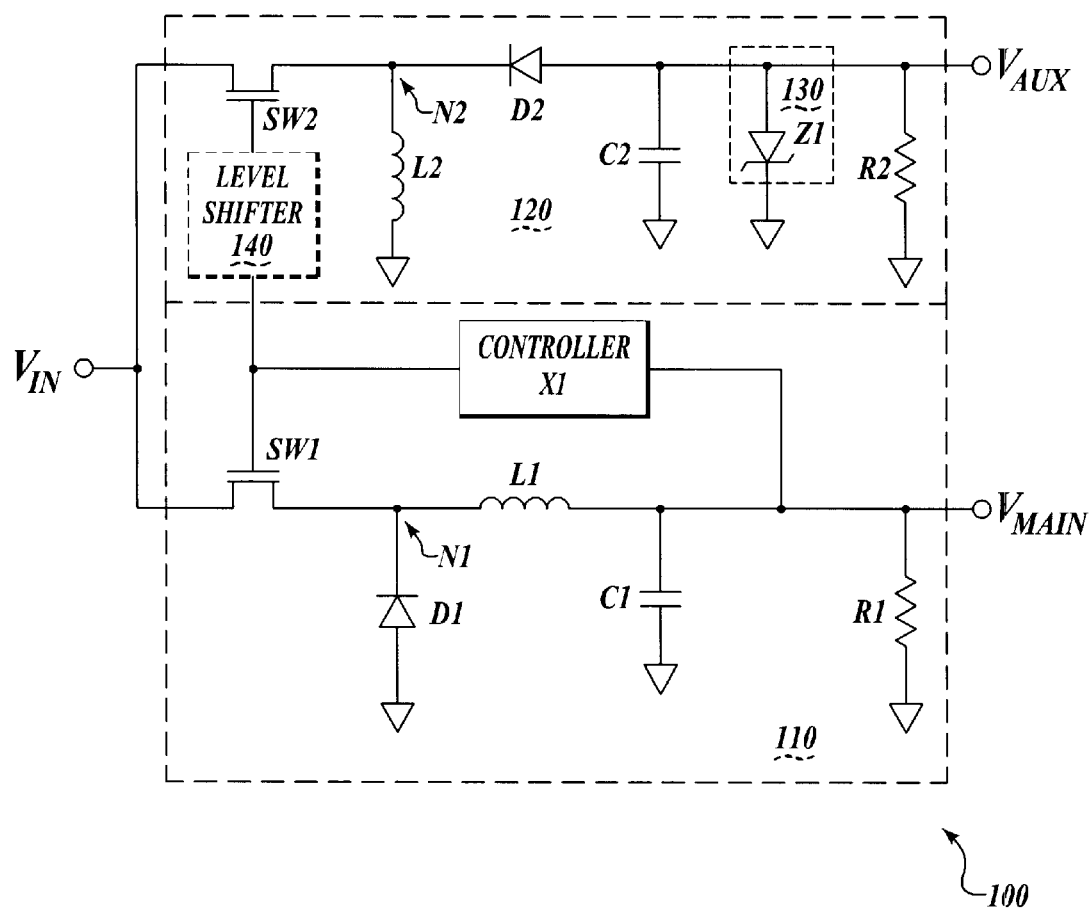

DISCONTINUOUS-MODE BUCK-BOOST SLAVE CONVERTER WORKING OFF A CONTINUOUS-MODE MASTER BUCK CONVERTER

FIELD OF THE INVENTION

The present invention relates generally to switching power supplies, and more particularly to a switching power supply having a continuous-mode master buck converter and a discontinuous-mode buck-boost slave converter.

BACKGROUND OF THE INVENTION

Switched-mode power supplies ("converters") alternately store and output energy. Converters receive either a DC or rectified AC voltage as an input. Energy from the input voltage is temporarily stored in an inductor during each switching cycle. An oscillating switch in converters is actuated to control how much of the energy is output. A filter is used to smooth the output into a DC voltage and current. The output DC voltage can be higher or lower than the input voltages. The output DC voltage may also be negative with respect to the input voltage.

Converters operate in either a discontinuous mode or a continuous mode. In the discontinuous mode, converters completely de-energize the inductor before the end of every switching cycle. Thus, there is no current in the inductor at the start of every switching cycle in the discontinuous mode. In the continuous mode, converters do not completely de-energize the inductor before the end of every switching cycle. Thus, the current in the inductor never reaches a point where there is no current in the inductor in the continuous mode.

The output of a converter is determined in part by the duty ratio. The duty ratio is equal to the time period in which the switch is "on" divided by the time period of the switching cycle ($D=T_{on}/T$). The switching cycle time period is equal to the time period in which the switch is "on" plus the time period in which the switch is "off" ($T=T_{on}+T_{off}$).

There are three basic topologies of converters: the buck converter, the boost converter, and the buck-boost converter. The output voltage of the buck converter is equal to the input voltage multiplied by the duty ratio (Vout=Vin*D). Thus, the output voltage of the buck converter cannot be greater than the input voltage. Also, the output voltage of the buck converter cannot be negative.

In the boost converter (or "step-up" converter), the output voltage is equal to the input voltage times the switching cycle time period divided by the time period in which the switch is off (Vout=Vin*T/$T_{off}$). Thus, the output voltage of the boost converter cannot be less than the input voltage. Also, the output voltage of the boost converter cannot be negative with respect to the input voltage.

The buck-boost converter has an output voltage that has a polarity that is negative with respect to the input voltage. The output voltage is equal to the negative value of the input voltage multiplied by the ratio of the time period in which the switch is on to the time period in which the switch is off (Vout=−Vin*$T_{on}/T_{off}$). Thus, the output voltage has a magnitude that is either stepped-up or stepped-down from the input voltage as determined by the duty ratio.

Transformer-coupled converters can be derived from the basic converter topologies. The inductor of a basic converter is replaced with a transformer in a transformer-coupled converter topology. Transformer coupling provides the advantages of DC isolation. The polarity of the output can be changed by reversing the connections to the secondary winding of the transformer. Additionally, the output voltage can be scaled by adjusting the ratio of the primary to secondary windings of a transformer.

The flyback converter is a buck-boost-type converter that has a transformer that replaces the simple inductor of the buck-boost converter. Thus, the transfer function (i.e., the relationship of the output voltage to the input voltage) of the flyback converter is similar to the buck-boost converter. The output voltage of flyback converter has a magnitude that is either stepped-up or stepped-down from the input voltage.

The forward converter is a buck-type converter that has a transformer that replaces the simple inductor of the buck converter. Thus, the transfer function of the forward converter is similar to the buck converter. The output voltage of the forward converter is equal to the input voltage multiplied by the duty ratio.

SUMMARY OF THE INVENTION

The present invention is directed to an efficient, well-regulated slave buck-boost converter that is driven from a master buck converter. The derived transfer function of the slave buck-boost converter that is being driven from a master buck converter is not dependent upon the input voltage. Thus, line regulation is automatically achieved. Load regulation is achieved by using a shunt regulator at the output of the slave buck-boost converter. The shunt regulator is arranged such that operating the slave buck-boost converter at its designed maximum load is almost as efficient as a conventional buck-boost converter. The slave converter is operated in discontinuous mode so that changing the inductance of the slave converter provides a desired voltage output.

According to one aspect of the invention, the power supply for receiving an input voltage and providing a main output voltage and an auxiliary output voltage comprises a continuous mode master converter, and a discontinuous mode slave converter. The continuous mode master converter is configured to provide the main output voltage, and includes a controller that is configured to produce a modulated signal at a controller output node for regulating the main output voltage. The main output voltage is determined by a product of the input voltage and a duty ratio of the modulated signal. The discontinuous mode slave converter is configured to provide the auxiliary output voltage, and is coupled to the controller output node. The auxiliary output voltage is determined by a product of the input voltage and a ratio of the time period in which the modulated signal is in an "on" state to the time period in which the modulated signal is in an "off" state.

According to another aspect of the invention, a method for providing a main output voltage and an auxiliary output voltage comprises using a controller in a continuous mode master converter to provide a modulated signal. The continuous mode master converter is used to provide the main output voltage in response to the modulated signal. The modulated signal is coupled to a control terminal of a discontinuous mode slave converter. The continuous mode slave converter is used to provide the auxiliary output voltage in response to the modulated signal.

A more complete appreciation of the present invention and its improvements can be obtained by reference to the accompanying drawings, which are briefly summarized below, to the following detailed description of illustrated embodiments of the invention, and to the appended claims.

BRIEF DESCRIPTION OF THE DRAWINGS

FIG. 1 is a schematic of an example multiple output power supply that is arranged in accordance with the present invention.

DETAILED DESCRIPTION OF THE PREFERRED EMBODIMENT

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected, or an indirect connection through one or more passive or active intermediary devices. The term "circuit" means either a single component or a multiplicity of components, either active and/or passive, that are coupled together to provide a desired function. The term "signal" means at least one current, voltage, or data signal. The term "converter" includes DC-DC converters, switching regulators, switching power supplies, and the like. Referring to the drawings, like numbers indicate like parts throughout the views.

Modem electronic circuits typically require well-regulated power supplies. Well-regulated power supplies provide line regulation and load regulation. Line regulation refers to the ability of a power supply to prevent a change in the output voltage that is caused by a change in the power supply input voltage. Load regulation refers to the ability of a power supply to prevent a change in the output voltage that is caused by a change in the power supply load.

Regulation in conventional power supplies is often achieved by using a feedback loop. The output of a conventional power supply is continuously adjusted by a feedback loop to maintain a desired level. The output voltage is compared with a desired voltage level, and the duty ratio of the converter switch is adjusted in response to maintain the desired output voltage level.

Regulation of conventional converters that are arranged in a master-slave configuration is problematic. The duty ratio of the master converter switch is the same as the duty ratio of the switch of the slave converter. Achieving regulation for the slave converter is difficult because the duty ratio of the slave converter is not independently controlled with respect to the master controller.

It is also difficult to achieve a desired voltage output for a conventional slave converter that is independent of the voltage output of the master converter. It is difficult to achieve the desired voltage output because, as mentioned above, the switch of the master converter and the switch of the conventional slave converter are not independently controlled.

The present invention is directed to a slave buck-boost converter that is driven from a master buck converter. As discussed below, the derived transfer function of the slave buck-boost converter is not dependent upon the input voltage. Line regulation is automatically achieved by using the duty cycle produced by the feedback loop for the master converter. Load regulation is achieved by using a shunt regulator for the output of the slave buck-boost converter. The shunt regulator is arranged such that operating the slave buck-boost converter at its designed maximum load is comparable to the efficiency of a conventional buck-boost converter. Also as discussed further below, the slave converter is operated in discontinuous mode so that the desired voltage output may be adjusted by changing the inductance of the slave converter.

The transfer function for a discontinuous mode buck-boost converter (which is described below as the auxiliary slave converter) is:

$$Vaux = D^2 * Vin^2 * 10^6 / (2 * L * f * Iaux), \text{ where} \quad (I)$$

Vaux is the nominal set output voltage in Volts,

D is the duty ratio,

Vin is the input voltage in Volts,

L is the inductance in $\mu$H, f is the switching frequency in Hz, and

Iaux is the maximum load in Amperes.

For simplicity, the forward voltage drops across the switch and the diode of the discontinuous mode buck-boost converter (which are discussed below with respect to FIG. 1) have been ignored.

The transfer function for a continuous mode buck converter (which is described below as the main master converter) is:

$$D = Vmain\, Vin, \text{ where} \quad (II)$$

D is the duty ratio,

Vmain is the nominal set output voltage in Volts, and

Vin is the input voltage in Volts.

The duty ratio of the switch of the master buck converter is the same as that for the switch of the auxiliary slave buck-boost converter. Accordingly, Equation II can be substituted in D of Equation I as follows:

$$Vaux = Vmain^2 * 10^6 / (2 * L * f * Iaux). \quad (III)$$

The substitution of Equation II into Equation I results in the Vin term being eliminated in Equation III. The significance of the elimination of the Vin term is that, in theory, an auxiliary discontinuous mode buck-boost converter driven from a main continuous mode buck converter has perfect line regulation. In practice, voltage drops across a switch and diode of the auxiliary converter affect the line regulation such that the line regulation is typically within 1–3 percent.

FIG. 1 is a schematic of an example multiple output power supply (100) that is arranged in accordance with the present invention. As shown in the figure, multiple output power supply 100 includes buck converter 110 and buck-boost converter 120. Buck converter 110 includes switch SW1, diode D1, inductor L1, capacitor C1, controller X1, and resistor R1. Buck-boost converter 120 includes switch SW2, inductor L2, diode D2, capacitor C2, regulator 130, resistor R2, and optional level shifter 140.

A first terminal of switch SW1 is coupled to node Vin. A second terminal of switch SW1 is coupled to node N1. A control terminal of switch SW1 is coupled to an output of controller X1. An input of controller X1 is coupled to node Vmain. The cathode of diode D1 is coupled to node N1. The anode of diode D1 is coupled to ground. A first terminal of inductor L1 is coupled to node N1. A second terminal of inductor L1 is coupled to node Vmain. Capacitor C1 is coupled between node Vmain and ground. Resistor R1 is coupled between node Vmain and ground.

A first terminal of switch SW2 is coupled to node Vin. A second terminal of switch SW2 is coupled to node N2. A control terminal of switch SW2 is coupled to an output of controller X1, or to the output of optional level shifter 140, if present. The input of optional level shifter 140, if present, is coupled to an output of controller X1. Inductor L2 is coupled between node N2 and ground. The cathode of diode D2 is coupled to node N2. The anode of diode D2 is coupled to node Vaux. Capacitor C2 is coupled between node Vaux and ground. Regulator 130 is coupled between node Vaux and ground. Resistor R2 is coupled between node Vaux and ground.

Components SW1, D1, L1, and C1 are configured as a buck-type converter. Resistor R1 is representative of a load for the buck-type converter. Controller X1 is configured in a feedback loop for the buck-type converter. Controller X1 is configured to provide line and load regulation for the buck-type converter. Controller X1 provides regulation by comparing the voltage (not shown) at node Vmain with a reference voltage and providing a pulse-width modulated output to switch SW1. Thus, the duty ratio of the buck-type converter is varied by controller X1 to provide regulation.

In operation, the voltage is applied to node Vin. Controller X1 provides a pulse-width modulated output to turn switch SW1 on and off. Inductor L1 energizes when switch SW1 is on. Inductor L1 is operated in a continuous mode, where the current in the inductor cannot fall to zero. When switch SW1 is turned off, diode D1 provides an alternate path for the current in inductor L1 to keep flowing. A voltage potential according to the voltage drop of the diode (which is typically −0.6 V) is developed at node N1 to force current to flow. Capacitor C1 is configured to maintain Vmain at a relatively constant level.

As mentioned above, the output voltage (Vmain) of a buck converter is determined by the transfer function Vout=Vin*D, where $D=T_{on}/T$ and $T=T_{on}+T_{off}$. Thus, the output voltage is a function of the input voltage and the duty ratio.

Components SW2, D2, L2, and C2 are configured as a buck-boost-type converter. Resistor R2 is representative of a load for the buck-boost-type converter. Controller X1 does not provide load regulation for the voltage at node Vaux. However, controller X1 provides the same pulse-width modulated output (at the same duty ratio) to switch SW2 as it does to switch SW1. Thus, buck-boost converter 120 is provided the same line regulation that is provided for buck converter 110.

Regulator 130 provides load regulation for buck-boost converter 120 by regulating the voltage at node Vaux. Regulator 130 is configured as a shunt regulator and can be implemented using a Zener diode (Z1). Regulator 130 is configured to conduct current only when the voltage at node Vaux rises above a design threshold. The design threshold is selected to be slightly higher than the predicted voltage at node Vaux when operating at maximum design load. The voltage at node Vaux rises when the operating load falls below the maximum design load. Regulator 130 shunts current to ground when the design threshold is exceeded such that the voltage at node Vaux is maintained at a relatively constant level. Regulator 130 does not conduct current when the voltage at node Vaux is below the design threshold. Thus, buck-boost converter 120 is highly efficient when buck-boost converter 120 is operating at or near the maximum design load. (The method of operation of regulator 130 is different from the conventional use of a Zener diode regulator, where the arbitrary output voltage is clamped through a dissipative resistor-Zener combination to force regulation.)

The maximum external load should be increased by about 140 percent when a Zener diode (Z1) is used as a regulator. Zener diode Z1 begins to conduct when the applied voltage crosses a "knee" in the characteristic curve for the Zener diode used. Additional "knee" current continues to flow in parallel through Zener diode Z1. Parasitics also modify the "ideal response" of regulator components such that the "actual" flyback voltage has a waveform that is different from the ideal response. The actual flyback voltage requires additional current during the second half of the switching cycle than would be required for an ideal flyback voltage. Thus, for example, a 20 mAmp external load may require a design load of 28 mA.

In operation, a voltage is applied to node Vin. Controller X1 provides a pulse-width modulated output to actuate switch SW2. Inductor L2 energizes when switch SW2 conducts. Inductor L2 de-energizes when switch SW2 is open. Because inductor L1 is operated in a discontinuous mode, inductor L2 de-energizes completely. The current in the inductor flows through an alternate path that is provided by diode D2 when inductor L2 de-energizes. A voltage potential ("flyback voltage") is determined by the volt-second rule. A flyback voltage waveform is produced such that the flyback voltage waveform contains the negative of the volt-seconds applied in the first-half of the switching cycle. The flyback voltage is produced when inductor L2 de-energizes. The flyback voltage is sustained for a length of time that is proportional to the value of inductor L2. The product of the flyback level and the length of time that the flyback level is sustained is equal to the volt-seconds applied in the first half of the switching cycle. Capacitor C1 is configured to maintain Vmain at a relatively constant level.

The output voltage for a discontinuous mode buck-boost converter is determined by Equation I. Equation I shows that Vaux is inversely proportional to the inductor and the output load. A smaller inductor produces a greater voltage at the output. Thus, the level of the output voltage (Vaux) can be realized by selecting an appropriate value for the inductor.

However, the value of the inductor must not exceed the critical level at which the inductor would switch from discontinuous mode to continuous mode. For example, assuming Vin=12 Volts, f=500 KHz, and a load of 28 mA, a value of 82 $\mu$H for the inductor can be selected to provide an output voltage of 5.1 Volts. The value of 82 $\mu$H for the inductor is below the critical level in this example.

Other embodiments of the invention are possible without departing form the spirit and scope of the invention. For example, a flyback converter may be used in place of the example buck-boost converter. Likewise, a forward converter may be used in place of the example buck converter. Another embodiment may use the output of the buck converter to drive the voltage input of the buck-boost converter. Optional level converter 140 can be used to adjust the level of a control signal such that both switches (SW1 and SW2) can be driven by the same signal if the switches have differing drive requirements.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A power supply for receiving an input voltage and providing a main output voltage and an auxiliary output voltage, wherein the main output voltage is provided at a main output node, and wherein the auxiliary voltage is provided at an auxiliary output node, comprising:

a continuous mode master converter that is configured to provide the main output voltage, wherein the master converter comprises a controller that is configured to produce a modulated control signal at a controller output node for regulating the main output voltage, and wherein the main output voltage is determined by a product of the input voltage and a duty ratio of the modulated control signal; and a discontinuous mode slave converter that is configured to provide the auxiliary output voltage, wherein the slave converter is coupled to the controller output node, and wherein the auxiliary output voltage is determined by a product of the input voltage and a ratio of the time period in which the modulated control signal is in an "on" state to the time period in which the modulated control signal is in an "off" state.

2. The power supply of claim 1, wherein the master converter comprises a buck converter.

3. The power supply of claim 1, wherein the slave converter comprises a buck-boost converter.

4. The power supply of claim 1, wherein the master converter comprises a forward converter.

5. The power supply of claim 1, wherein the slave converter comprises a flyback converter.

6. The power supply of claim 1, wherein the slave converter comprises a switch that is controlled by the modulated control signal.

7. The power supply of claim 6, wherein the slave converter further comprises a level shifter that is coupled between a control terminal of the switch and the controller output node.

8. The power supply of claim 1, wherein the slave converter comprises a regulator that is coupled between a control terminal of the switch and the auxiliary output node, wherein the regulator is configured to conduct current when the auxiliary output voltage rises above a design threshold for the auxiliary output voltage.

9. The power supply of claim 8, wherein the regulator is a Zener diode, wherein a cathode of the Zener diode is coupled to the auxiliary output node and an anode of the Zener diode is coupled to a voltage reference such as ground.

10. A method for providing a main output voltage and an auxiliary output voltage, comprising:

using a controller in a continuous mode master converter to provide a modulated control signal;

using the continuous mode master converter to provide the main output voltage in response to the modulated control signal;

coupling the modulated control signal to a control terminal of a discontinuous mode slave converter, and using the discontinuous mode slave converter to provide the auxiliary output voltage in response to the modulated control signal.

11. The method of claim 10, wherein the continuous mode master converter that is used is a continuous mode buck converter.

12. The method of claim 10, wherein the discontinuous mode slave converter that is used is a discontinuous mode buck-boost converter.

13. The method of claim 10, wherein the continuous mode master converter that is used is a continuous mode forward converter.

14. The method of claim 10, wherein the discontinuous mode slave converter that is used is a discontinuous mode flyback converter.

15. The method of claim 10, further comprising level-shifting the modulated control signal that is coupled to the control terminal of the discontinuous mode slave converter.

16. The method of claim 10, further comprising regulating the auxiliary output voltage.

17. The method of claim 10, further comprising regulating the auxiliary output voltage by shunting current when the auxiliary output voltage rises above a design threshold for the auxiliary output voltage.

18. A switching power supply for providing a main output voltage and an auxiliary output voltage, comprising:

means for using a controller in a continuous mode master converter to provide a modulated control signal;

means for using the continuous mode master converter to provide the main output voltage in response to the modulated control signal;

means for coupling the modulated control signal to a control terminal of a discontinuous mode slave converter, and means for using the discontinuous mode slave converter to provide the auxiliary output voltage in response to the modulated control signal.

19. The switching power supply of claim 18, further comprising means for level-shifting the modulated control signal that is coupled to the control terminal of the discontinuous mode slave converter.

20. The switching power supply of claim 19, further comprising means for regulating the auxiliary output voltage by shunting current when the auxiliary output voltage rises above a design threshold for the auxiliary output voltage.

* * * * *